UNITED STATES PATENT OFFICE.

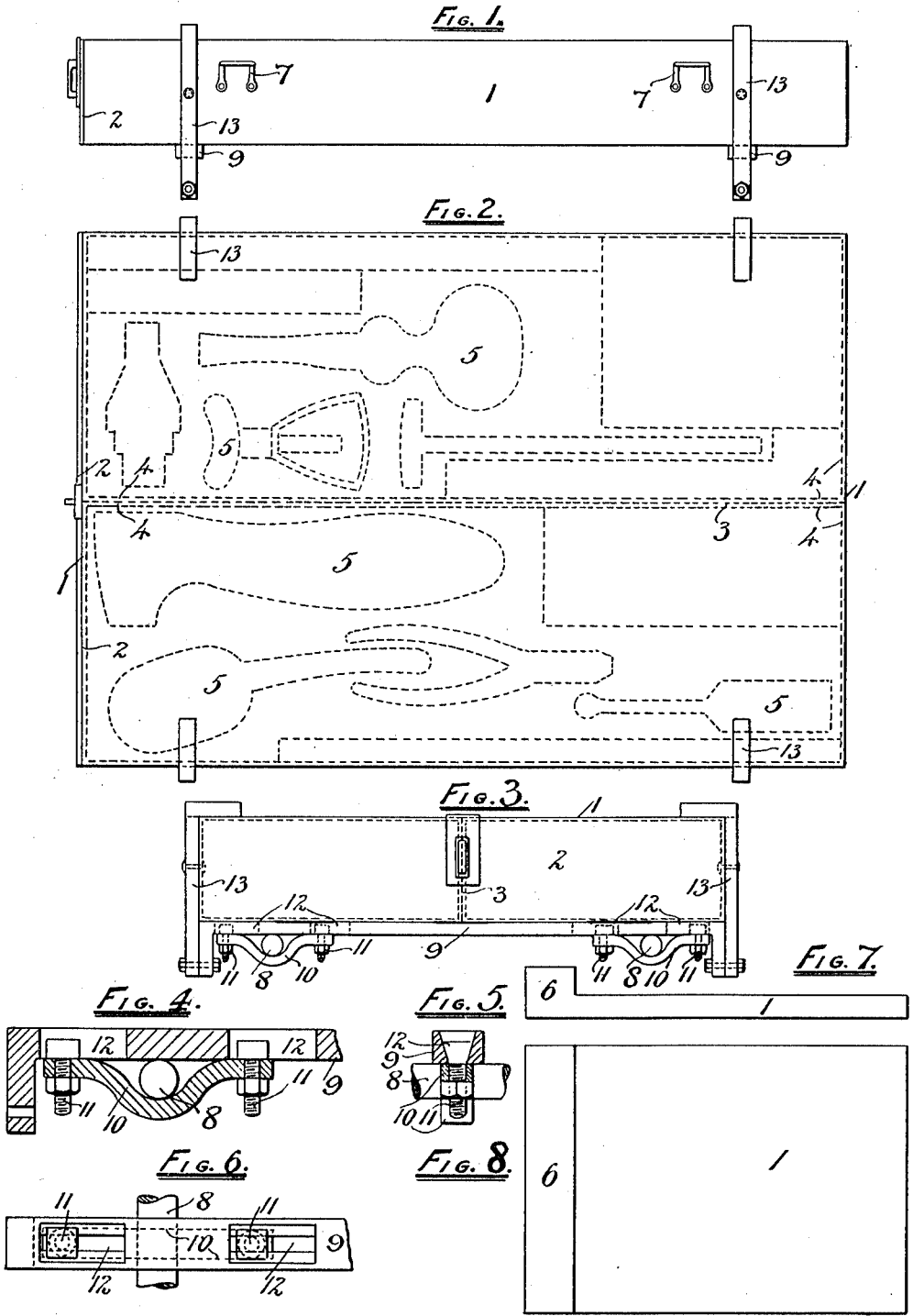

THOMAS BRAIDWOOD, OF BRIDGE-OF-ALLAN, SCOTLAND.

COMBINED TOOL-BOX AND CARRIER FOR MOTOR AND OTHER CYCLES.

1,079,286.  Specification of Letters Patent.  Patented Nov. 18, 1913.

Application filed November 19, 1912. Serial No. 732,284.

*To all whom it may concern:*

Be it known that I, THOMAS BRAIDWOOD, a subject of the King of Great Britain and Ireland, and a resident of Bridge-of-Allan, in the county of Stirling, Scotland, have invented new and useful Improvements in a Combined Tool-Box and Carrier for Motor and other Cycles, of which the following is a specification.

This invention has reference to and comprises improvements in a combined tool box and carrier for motor or other cycles.

In order that my said invention may be properly understood I have hereunto appended one sheet of illustrative drawings in which—

Figure 1 is a side elevation of the combined tool box and carrier, Fig. 2 is a plan thereof with the drawers, Fig. 3 is an end view, Figs. 4 to 6 are respectively an end view, a side view and a plan illustrating one method of securing the combined tool box and carrier to the bars of the ordinary carrier, and Figs. 7 and 8 are respectively a side view and a plan indicating a modified construction.

Referring to these drawings:—As illustrated a shallow box of metal, wood, or any other suitable material is placed above the usual carrier bars, attached to motor and other cycles, to which it is fastened by bolts and nuts, screws, or in any suitable manner, the fastenings being made adjustable to fit any size of fixed carrier. Also, with my invention, the top of the box when in place may be used as the carrier. The box 1 is closed on the top and all sides except at the back, where a door 2 is fitted and hinged to open outward. The box 1 is preferably divided into two divisions by the partition 3, each division being fitted with a drawer 4. These drawers may be fitted with divisions to hold various tools and other articles, but are preferably formed with recesses 5 to receive various tools and fittings, as indicated in dotted lines, and divided off compartments to receive other articles, such as puncture outfit, bolts, nuts and washers, keys, files, spanners and the like. In order that the depth of the main part of the box 1 be reduced as much as possible the back part 6 may be made deeper as indicated by Figs. 7 and 8 in order to accommodate such tools as require more depth than the others. The door 2 at the back which is fitted with a hasp fastening allows the drawers to be taken out without interfering with the articles which are being carried on the top of the box. If it is desired to increase the carrying accommodation, the box may be made wider than the ordinary carrier and fitted externally with snugs or the like 7, as indicated in Fig. 1, or with buckles and straps to which to fasten the articles to be carried.

As illustrated by Figs. 4 to 6 the box 1 is secured to the longitudinal bars 8 of the ordinary carrier by two or more transverse bars 9 to which it is secured, by brackets or bars 13, and which rest on the longitudinal bars 8 and are secured to same by bent bars or clips 10 and bolts 11 and nuts.

When the combined tool box and carrier is made to a size to fit a stock size of carrier, the bolts 11 are fixtures but when it is desired to render the securing devices adjustable to carriers which have longitudinal bars set at different distances apart the heads of the bolts 11 are formed of dovetail or other shape and slide in correspondingly shaped slots or grooves 12 formed in the bars 9. This allows of the clips 10 receiving a certain amount of transverse motion to bring them into position to fit the bars 8.

The box 1 is secured to the bent down ends of the bars 9 by brackets or bars 13 riveted to the box and bolted to the bars. If desired, the top of the bars 13 may be level with the top of the box, as indicated in dotted lines, instead of being bent over, so as to keep the top of the box flush.

What I claim and desire to secure by Letters Patent is:—

1. A combined tool box and carrier for motorcycles or the like comprising a box; bars secured to said box and having grooves formed therein; clips; and bolts slidably secured to said bars within the grooves and to said clips whereby the latter may be adjusted to secure the box to the cycle.

2. A combined tool box and carrier for motorcycles or the like comprising a box;